US008860381B2

(12) United States Patent
Holliday

(10) Patent No.: US 8,860,381 B2
(45) Date of Patent: Oct. 14, 2014

(54) BALANCING VIBRATIONS AT HARMONIC FREQUENCIES BY INJECTING HARMONIC BALANCING SIGNALS INTO THE ARMATURE OF A LINEAR MOTOR/ALTERNATOR COUPLED TO A STIRLING MACHINE

(75) Inventor: Ezekiel S. Holliday, Belpre, OH (US)

(73) Assignee: Sunpower, Inc., Athens, OH (US)

( * ) Notice: Subject to any disclaimer, the term of this patent is extended or adjusted under 35 U.S.C. 154(b) by 232 days.

(21) Appl. No.: 13/549,741

(22) Filed: Jul. 16, 2012

(65) Prior Publication Data
US 2014/0015497 A1    Jan. 16, 2014

(51) Int. Cl.
*H02P 11/00* (2006.01)

(52) U.S. Cl.
USPC ................................. 322/32; 322/37; 363/37

(58) Field of Classification Search
USPC .............................. 322/22, 29, 32, 37; 363/37
See application file for complete search history.

(56) References Cited

U.S. PATENT DOCUMENTS

| 4,339,960 | A | 7/1982 | Senft |
| 4,490,841 | A | 12/1984 | Chaplin et al. |
| 6,871,495 | B2 * | 3/2005 | Lynch et al. ..................... 60/522 |
| 7,511,459 | B2 * | 3/2009 | Holliday ........................... 322/24 |
| 7,629,699 | B2 * | 12/2009 | Annen et al. .................... 290/1 A |
| 8,559,197 | B2 * | 10/2013 | Cullinane et al. ............... 363/37 |
| 2001/0053951 | A1 | 12/2001 | Goto et al. |
| 2004/0119434 | A1 | 6/2004 | Dadd |
| 2005/0184214 | A1 | 8/2005 | Mizushima et al. |
| 2010/0095668 | A1 | 4/2010 | Beale et al. |
| 2014/0013842 | A1 * | 1/2014 | Holliday .......................... 73/462 |

FOREIGN PATENT DOCUMENTS

| GB | 2255256 A | 10/1992 |
| WO | 2007147994 A1 | 12/2007 |

* cited by examiner

*Primary Examiner* — Nicholas Pomomarenko
(74) *Attorney, Agent, or Firm* — Frank H. Foster; Kremblas & Foster

(57) ABSTRACT

Vibrations at harmonic frequencies are reduced by injecting harmonic balancing signals into the armature of a linear motor/alternator coupled to a Stirling machine. The vibrations are sensed to provide a signal representing the mechanical vibrations. A harmonic balancing signal is generated for selected harmonics of the operating frequency by processing the sensed vibration signal with adaptive filter algorithms of adaptive filters for each harmonic. Reference inputs for each harmonic are applied to the adaptive filter algorithms at the frequency of the selected harmonic. The harmonic balancing signals for all of the harmonics are summed with a principal control signal. The harmonic balancing signals modify the principal electrical drive voltage and drive the motor/alternator with a drive voltage component in opposition to the vibration at each harmonic.

7 Claims, 5 Drawing Sheets

BALANCING VIBRATIONS AT HARMONIC FREQUENCIES BY INJECTING HARMONIC BALANCING SIGNALS INTO THE ARMATURE OF A LINEAR MOTOR/ALTERNATOR COUPLED TO A STIRLING MACHINE

STATEMENT REGARDING FEDERALLY-SPONSORED RESEARCH AND DEVELOPMENT

This invention was made with Government support under contract Task Order 5 NNC09TA29T awarded by NASA. The Government has certain rights in the invention.

CROSS-REFERENCES TO RELATED APPLICATIONS (Not Applicable)

REFERENCE TO AN APPENDIX (Not Applicable)

BACKGROUND OF THE INVENTION

This invention relates generally to the reduction or elimination of mechanical vibrations, particularly in a coupled pair that comprises a Stirling cycle machine that is drivingly linked to an electromagnetic linear motor or alternator and more particularly relates to the reduction or elimination of mechanical vibration at harmonics of the fundamental operating frequency of reciprocation of the coupled pair through integration of the control system of the invention with prior art controls and vibration balancers.

Many machines vibrate as a consequence of the repetitive acceleration and deceleration of one or more periodically moving masses that are a part of the machine. In some environments the vibrations can be uncomfortable, distracting or annoying and in some they can interfere with the operation of other equipment and can even result in damage. One manner of reducing vibration is to mount the vibrating machine to another mass through an intermediate vibration damper, which may be a device or material that absorbs some of the energy of the vibration. However, because that way can only partially reduce the vibrations, a more effective way to eliminate, or at least minimize, the amplitude of the vibrations is to rigidly mount a vibration balancer to the vibrating machine. A vibration balancer generates forces that oppose the vibration; that is, it generates forces that are equal or nearly equal in amplitude but opposite in phase to, and thereby cancel or nearly cancel, the forces produced by the vibration.

Vibration balancers are generally of two types, passive vibration balancers and active vibration balancers, some of which are also known as tuned mass dampers, active mass dampers or vibration absorbers. A passive vibration balancer is essentially a resonant spring and mass system that is tuned to the operating frequency of the vibrating machine but is arranged to apply the forces from its accelerating and decelerating mass to the vibrating machine at a phase that is 180° out of phase with the forces resulting from the vibration. An active vibration balancer is essentially a mass, and may also be linked to a spring, but the motion of the mass is controlled by a feedback control system that senses the vibrations and drives the mass in opposition to the vibrations.

Although a passive balancer is less expensive, it has the disadvantage that it can only respond to vibrations at the one resonant frequency to which it is tuned. An active balancer can respond to small variations in the frequency of the vibrations and can apply a compensating force at an amplitude that better cancels the vibration but an active balancer is more expensive and requires a controller to drive the active balancer at the required amplitude and phase. As far as known to me, neither a passive nor an active balancer has balanced vibrations at harmonics of the fundamental operating frequency of a vibrating machine.

Therefore, it is an object and feature of the invention to provide a method and apparatus for diminishing or eliminating the vibrations of a machine at harmonics of the fundamental operating frequency of the machine.

A further object and feature of the invention is to not only balance the vibrations at harmonics of the fundamental operating frequency of the machine, but to do so without the addition of any mechanical structures for accomplishing that balancing.

BRIEF SUMMARY OF THE INVENTION

The invention is a method for balancing the vibration of a coupled pair comprising a linear motor/alternator that is drivingly linked to a prime mover or load. The linear motor/alternator has an armature winding and its reciprocation at an operating frequency is controlled by a digital processor from a command input. The method minimizes vibration of the coupled pair at harmonics of the operating frequency.

As in the prior art, a principal control signal is generated at the operating frequency from the command input and that principal control signal is applied to a power stage that controls the coupled pair by applying an alternating, principal electrical drive voltage to the armature winding. For the invention, the vibration of the coupled pair is sensed to provide a sensed vibration signal representing the sensed mechanical vibration of the coupled pair. A harmonic balancing signal is generated for at least one selected harmonic of the operating frequency and preferably a harmonic balancing signal is generated for each of several selected harmonics. The harmonic balancing signals are each generated by processing the sensed vibration signal with an adaptive filter algorithm of an adaptive filter. The adaptive filter algorithms for each selected harmonic has reference inputs at the frequency of the selected harmonic. The harmonic balancing signals for all of the selected harmonics are summed with the principal control signal. Each harmonic balancing signal at each selected harmonic of the operating frequency thereby modifies the principal electrical drive voltage and drives the motor/alternator of the coupled pair with a drive voltage component for each selected harmonic that is in opposition to the vibration at each selected harmonic.

Figure 1:
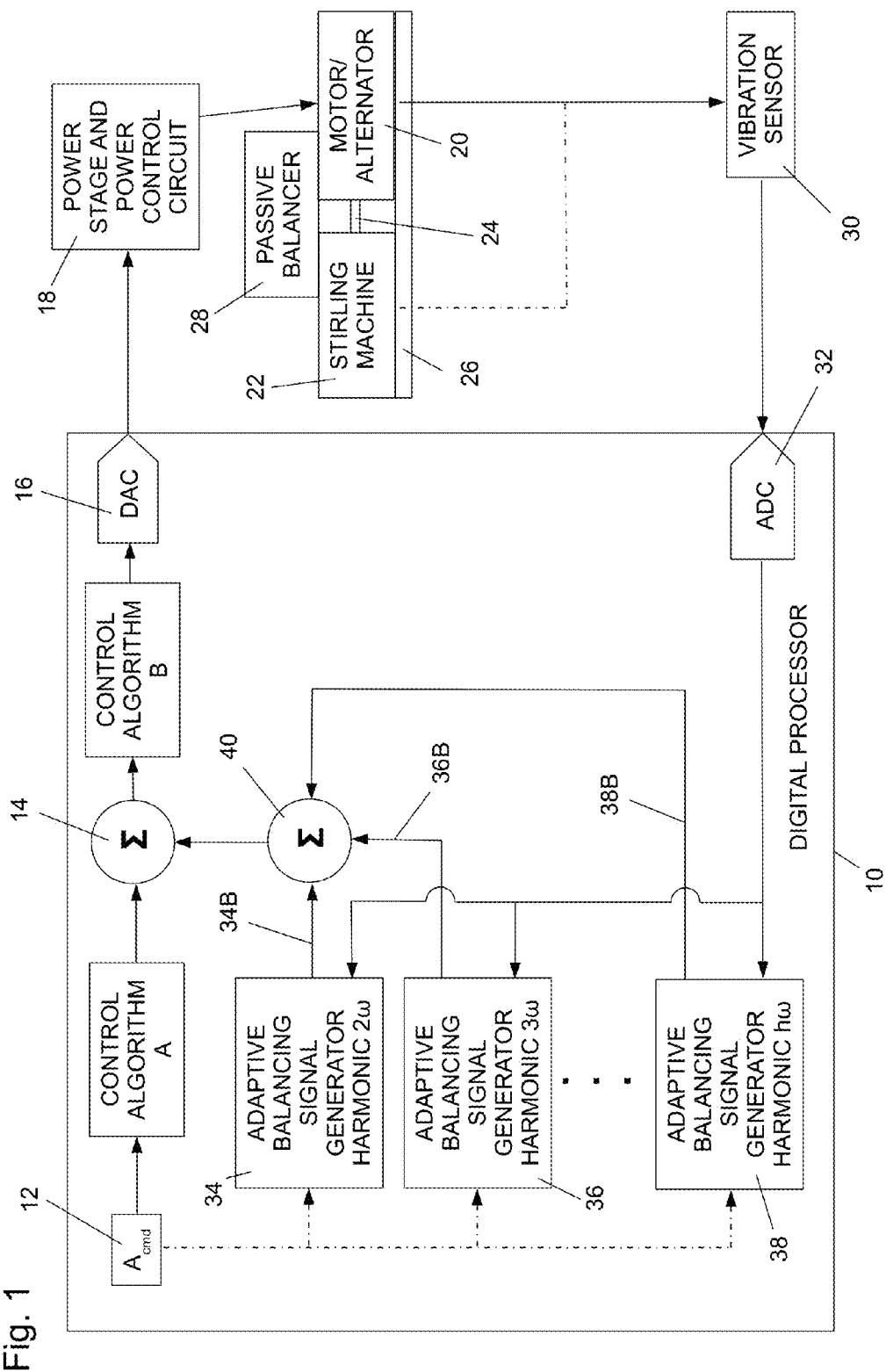
FIG. 1 is a block diagram illustrating the operation of the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

U.S. Pat. No. 7,511,459 is incorporated in this application by reference. This prior art patent shows an example of a control system for controlling a linear motor/alternator that is drivingly linked to a Stirling machine and which can be used with embodiments of the invention. More specifically, this patent discloses an example of what is referred to herein as a principal control system for applying a principal electrical drive voltage and current to the motor/alternator armature winding in order to control its operation at its operating frequency.

Terminology and Prior Art Fundamental Principles

Stirling machines are often drivingly linked to a linear motor or a linear alternator. A Stirling engine can be a prime mover connected to a linear alternator to generate electric power. A Stirling machine operated in a heat pumping mode can be connected to and driven by a linear electric motor and pumps heat energy from one of its heat exchangers to another of its heat exchangers. A Stirling machine that pumps heat is sometimes referred to as a cooler when its purpose is to cool a mass and is sometimes referred to as a heat pump when its purpose is to heat a mass. The Stirling heat pump and the Stirling cooler are fundamentally the same machine to which different terminology is applied. Both transfer heat energy from one mass to another. Consequently, the terms cooler/heat pump, cooler and heat pump can be used equivalently when applied to fundamental machines. Because a Stirling machine can be either an engine (prime mover) or a cooler/heat pump, the term Stirling "machine" is used generically to include both Stirling engines and Stirling coolers/heat pumps. They are basically the same power transducers capable of transducing power in either direction between two types of power, mechanical and thermal.

Similarly, both an electric linear motor and an electric linear alternator are the same basic device. They have a stator, ordinarily having an armature winding, and a reciprocating member that includes one or more magnets, usually permanent magnets. A linear motor/alternator can be mechanically driven in reciprocation by a prime mover to operate as an alternator to generate electrical power or can be driven by a source of alternating electrical power to operate as a motor providing a mechanical reciprocating output. Consequently, the term linear motor/alternator can be used to refer to this basic electro-mechanical device.

Because of the above-described operational duality, a Stirling machine operating as an engine can be used to drive a linear alternator and a linear motor can be used to drive a Stirling machine operating in a heat pumping mode. In both cases, the power piston of the Stirling machine is ordinarily directly connected to the reciprocating member of the linear motor or alternator so that they reciprocate as a unit. Additionally, linear electric motors and Stirling engines can be used to drive other loads, such as the piston of a compressor for compressing a gas, for example in a refrigerator, or for pumping a fluid.

Prior Art Part of Embodiments of the Invention

All of the embodiments of the invention are a combination of the control system of the invention integrated and combined with a prior art control system that controls a coupled pair that is a linear motor/alternator which is drivingly linked to a prime mover or load, most preferably a Stirling machine. Such coupled pairs are well known in the prior art. The motor/alternator has an armature winding to which a principal control signal is applied. Either the Stirling machine or the motor/alternator is the prime mover and the other is the load and there are a variety of control systems for controlling such coupled pairs. When the motor/alternator is used as an alternator to generate power, the armature winding provides electrical power output. When the motor/alternator is used as a motor, the electrical power to drive it is controlled and includes a principal control signal. In both cases, the type of prior art control to which the present invention is applicable is a control which accomplishes its control by applying a controlling voltage to the motor/alternator. The control causes the reciprocating pair to reciprocate at an operating frequency, prevents overstroking, matches a load power demand to the power output of the prime mover, controls the temperature for a heat pumping embodiment and/or maximizes the efficiency of the coupled pair.

FIGS. 1, 2, 4 and 5 all include a prior art principal control system. FIG. 1 illustrates the basic principles of the invention. Modern prior art control systems utilize a digital processor such as a microprocessor, microcontroller or digital signal processor (DSP). As known to those skilled in the art, digital control circuit operation is commonly described in terms of mathematical operations performed on signals by control algorithms that are executed by the digital processor. A "signal" includes the representation of an analog signal in digital data format. Operations are often described in terms of historical predecessor analog devices, such as filters and signal generators, that performed such operations, even though those operations in modern circuits are performed instead by digital signal processors programmed to execute algorithms.

Referring to FIG. 1, the prior art principal control system to which the invention is applied is illustrated along a path across the top of the digital processor 10. As in the prior art, a principal control signal is generated by the principal control system at an operating frequency of reciprocation and is applied to a power stage that controls the coupled pair by applying an alternating, principal electrical drive voltage to the armature winding of the motor/alternator. As common to most control systems, there is a command input 12 that is applied to a control algorithm. Command input 12 [$A_{cmd}$] is an amplitude input for operating the coupled pair at the fundamental driving frequency. The command input $A_{cmd}$ represents a stroke distance (e.g. in millimeters) or an armature coil voltage for driving the motor/alternator. The output from the principal control system controls the reciprocation of the coupled pair at its fundamental operating frequency.

In FIG. 1, the prior art control algorithm is illustrated as divided between a control algorithm A and a control algorithm B because, for purposes of the invention, there is a summing operation, or summing junction 14, illustrated between them. This illustrates that the control signal from the invention is applied to the principal control algorithm to modify the principal control signal in accordance with the invention but there may be some prior art control operations performed before and some performed after this summing operation. The result of the operation of the control algorithm is applied through a digital to analog converter 16 to a power stage 18 that converts the control signal to the high power required to drive the motor/alternator. The power stage may include additional control circuitry.

The output of the power stage 18 is applied to the armature winding of a motor/alternator 20. The motor/alternator 20 is drivingly connected to a Stirling machine 22 by a mechanical link 24 to form the coupled pair, the two components of which are mounted to a common mechanical support which is diagrammatically illustrated as support 26. In practice, the casing for the alternator and the casing for the Stirling machine are formed integrally or are directly connected together. The coupled pair is preferably also mechanically connected to a passive balancer which serves to reduce or eliminate vibration of the coupled pair at their operating frequency.

The Invention

The method of the invention minimizes vibration of the coupled pair at harmonics of the operating frequency. The basic concept is to sense and feed back the currently sensed amplitude, frequency and phase of the vibrations at frequencies that are harmonics of the operating fundamental frequency. The sensing of vibrations is essentially error detection because any vibration is error that is sought to be eliminated. A sinusoidally varying signal is generated for each harmonic frequency and its amplitude and phase are periodically varied, updated and adapted to generate a balancing signal for each harmonic. The balancing signal for each harmonic is continuously fed forward by injecting it into the principal control signal that controls the operation of the coupled pair at its operating fundamental frequency. The variation of each balancing signal by periodic updating adapts the balancing signal to any currently sensed vibration, so that the sinusoidal balancing signal for each harmonic is continuously applied to the linear motor/alternator to generate a compensating force at the appropriate phase, amplitude and frequency to bring the sensed vibrations at each harmonic to a minimum. This is somewhat different from a standard closed loop, negative feedback control system which requires an error to drive the output. Here the error (the vibration) is driven to zero but once it is driven to zero, an adaptive algorithm maintains the same compensating output except when it senses increased or decreased vibration in which case it modifies the compensating output to again bring the vibration (error) to zero.

Referring again to FIG. 1, a vibration sensor 30 is mounted in mechanical connection to the coupled pair (20, 22), for example by being mounted to its casing or housing support 26, or to a passive balancer 28 that is attached to the coupled pair. The vibration sensor 30 may be an accelerometer and senses the vibration of the coupled pair to provide a sensed vibration signal representing the sensed vibration.

The sensed vibration signal from the vibration sensor 30 is applied through an analog to digital converter 32 for processing by the digital processor 10. The sensed vibration signal in digital format is applied to each of a plurality of adaptive balancing signal generators, illustrated as 34, 36 and 38, each of which is an algorithm that generates a balancing signal for a different harmonic of the fundamental operating frequency. So, there is an adaptive balancing signal generator for each selected harmonic. Each adaptive balancing signal generator is assigned to and responds to one harmonic frequency. Although the invention can be practiced for balancing a single harmonic, preferably there are a plurality of such balancing signal generators for balancing a plurality of different harmonics. Although three balancing signal generators are illustrated for three harmonics $2\omega$, $3\omega$ and $h\omega$, where $\omega$ is the fundamental operating frequency and h is the $h^{th}$ harmonic, there can be as many balancing signal generators for as many harmonics and for whichever harmonics are selected by the designer.

As described in more detail below, the harmonic balancing signal for each selected harmonic is generated by processing the sensed vibration signal with an adaptive filter algorithm of an adaptive filter. Reference inputs at the frequency of the selected harmonic are applied to the adaptive filter algorithm. Consequently, each of the harmonic balancing signal generators 34, 36 and 38 have an output 34B, 36B and 38B that is a balancing signal for balancing its assigned harmonic.

All of the balancing signals at outputs 34B, 36B and 38B are summed with the principal control signal. As illustrated in FIG. 1, the harmonic balancing signals for each selected harmonic of the operating frequency are shown summed at summing junction 40 and their sum is then summed with the principal control signal at the summing junction 14. Therefore, the sum of the harmonic balancing signals is a fed forward signal that modifies the electrical drive voltage thereby driving the motor/alternator of the coupled pair with a drive voltage component for each selected harmonic in opposition to the vibration at each selected harmonic. So each harmonic balancing signal generator provides an output signal to the summing junction 40 at a frequency, amplitude and phase which drives the linear motor/alternator at a frequency, amplitude and phase to cancel the vibration at its assigned harmonic frequency to the extent practical.

Adaptive Filters

The harmonic balancing signals at outputs 34B, 36B and 38B are generated in part by use of adaptive filters. Adaptive filter techniques have been known in the prior art for decades. The adaptive filter algorithm that is preferred for use with the present invention is the Least Mean Squares (LMS) filter algorithm that was invented a half century ago. The art has developed various modified LMS algorithms as well as other adaptive filter algorithms which can be used with the present invention. These algorithms include SLMS a slight modification of the LMS algorithm, NLMS the normalized least mean squares filter and RLS the recursive least squares algorithm. The LMS algorithm is preferred because of its relative simplicity and suitability for use with the present invention. The LMS algorithm mimics a desired filter by finding the filter coefficients that relate to producing the least mean squares of an error signal. The error signal is the difference between a desired signal and the actual signal. In the present invention the error signal is the sensed vibration because the desired signal is no vibration.

An adaptive filter is basically a variable filter that is varied by its adaptive algorithm in response to a sensed error. The adaptive filter is adapted based upon the currently sensed error. The error signal is processed by the algorithm which then modifies or updates the variable filter. In the present invention the variable filter is a simple gain; that is, a multiplier (amplifier) the value of which is controllably varied by the algorithm in response to sensed error. The value of the variable filter is modified in response to the sensed error by being incremented or decremented by an amount selected by the designer and controlled by the algorithm and at a periodic rate selected by the designer and controlled by the algorithm. In this manner the algorithm increments and decrements the variable filter in a way that drives the error to as near zero as practical and continues to increment and decrement the variable filter as becomes necessary in view of subsequent error signals to maintain the error as near zero as is practical. Adaptive filter algorithms, such as the LMS algorithm, are standard algorithms described in the literature that operate to drive an error signal to zero.

The Adaptive Balancing Signal Generators of the Invention

Figure 2:
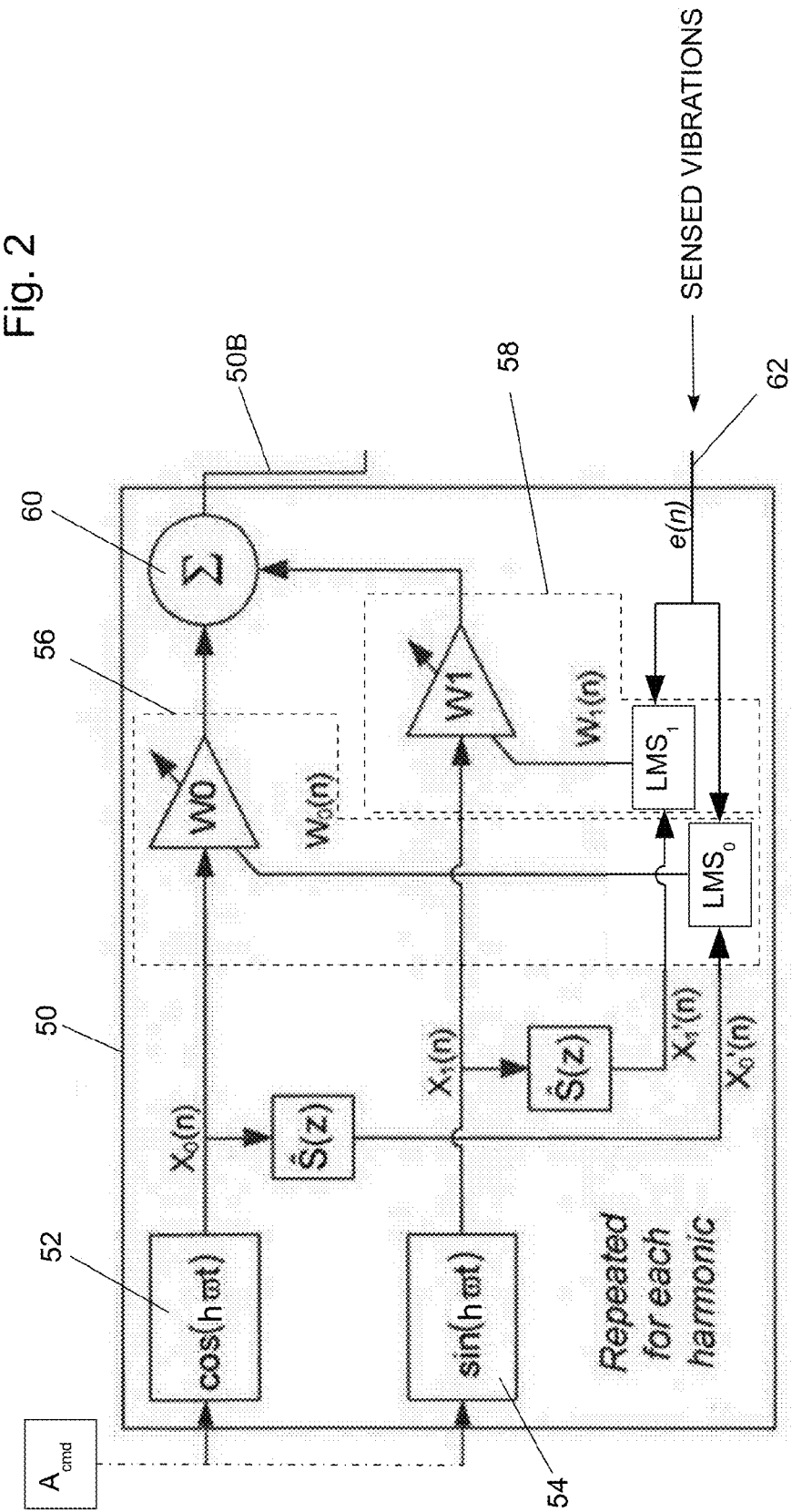
FIG. 2 is a block diagram illustrating the operation of the adaptive balancing signal generators that are components of the invention.
Figure 3:
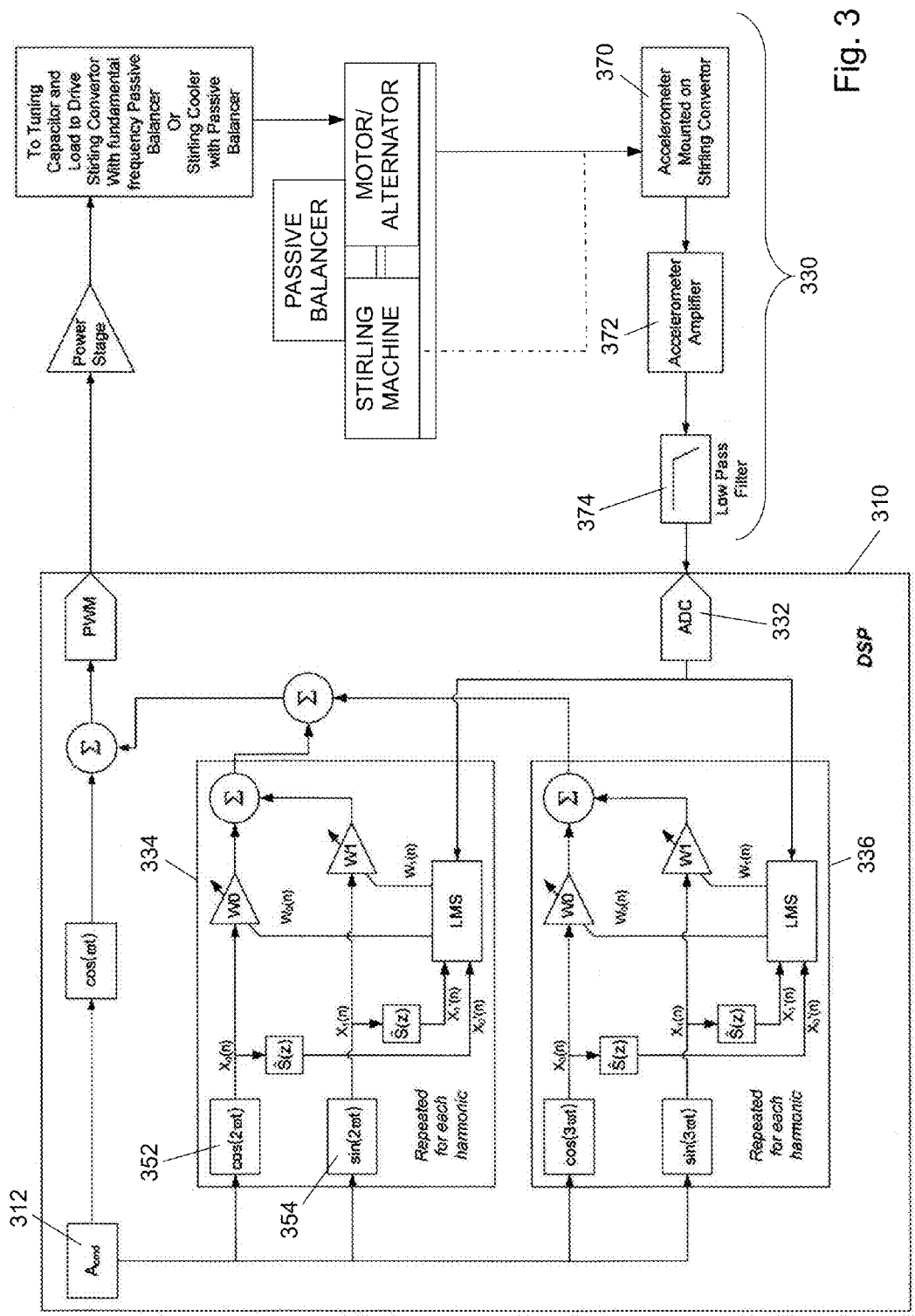
FIG. 3 is a diagram illustrating an embodiment of the invention.
Figure 4:
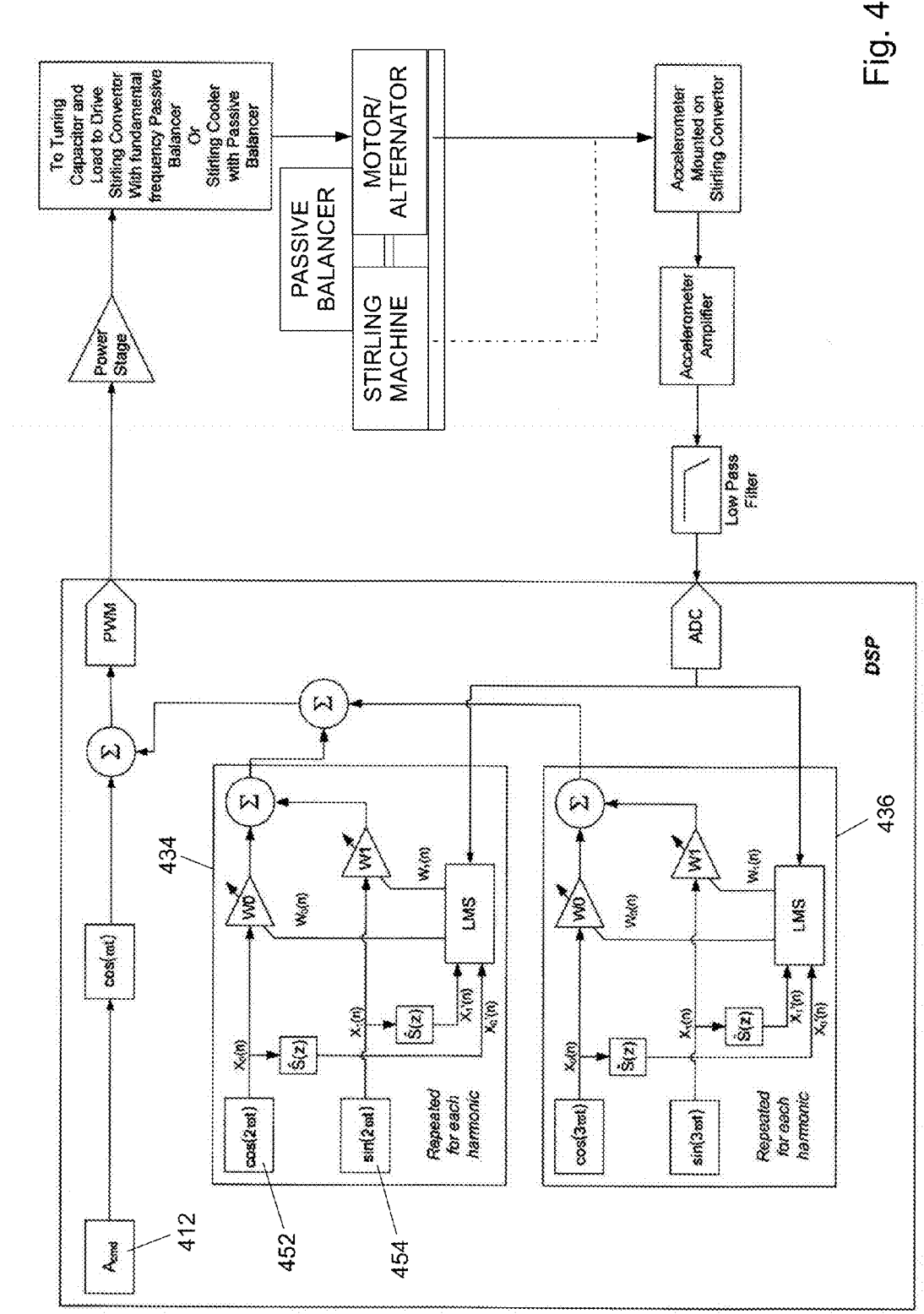
FIG. 4 is a diagram illustrating another embodiment of the invention.
Figure 5:
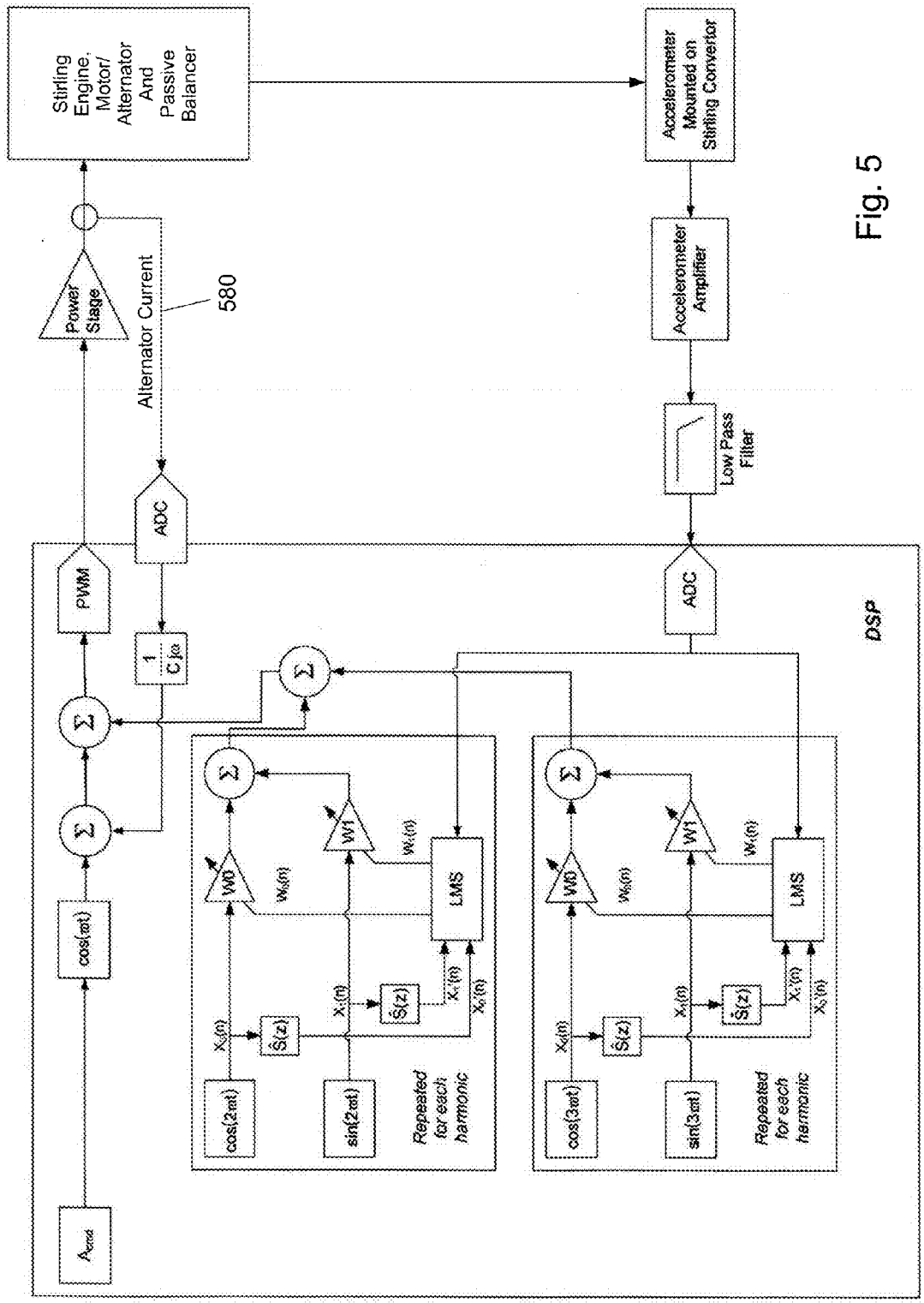
FIG. 5 is a diagram illustrating yet another embodiment of the invention.

For each harmonic which is sought to be balanced, there is an adaptive, balancing signal generator which is assigned to that particular harmonic. The purpose of each adaptive balancing signal generator is to derive and maintain, from the sensed vibration input, a signal that generates forces in the linear motor/alternator that oppose and cancel the vibration at its assigned harmonic frequency. FIG. 2 illustrates the adaptive balancing signal generators 34, 36 and 38 shown as blocks in FIG. 1. These adaptive balancing signal generators are identical except that each is adapted to operate at the different harmonic frequency which is assigned to it. Each adaptive, balancing signal generator 50 (FIG. 2) includes quadrature, sinusoidally varying reference signal generators 52 and 54. The reference generator 52 generates $\cos(h\omega t)$ where h is the $h^{th}$ harmonic that is assigned to the balancing signal generator and w is the fundamental operating frequency of the coupled pair. The reference generator 54 generates $\sin(h\omega t)$. As can be visualized from phasors representing the quadrature cos and sin functions, quadrature sinusoidal signals are components that can be summed to a resultant. The resultant can be at any phase and any amplitude merely by varying the amplitude of these two quadrature components. As can be seen in FIG. 3, the amplitude of the reference generators can be controlled by controlling their amplitudes as a function of $A_{cmd}$ so that their amplitudes are proportional to $A_{cmd}$. Alternatively, as seen in FIGS. 4 and 5, the reference generators can have a constant unit amplitude. The purpose of the sinusoidal reference signal generators 52 and 54 is to generate, at the frequency of the assigned harmonic, a pair of quadrature, sinusoidally varying, cos and sin reference signals The adaptive, balancing signal generator 50 also has two adaptive filters 56 and 58. The adaptive filter 56 has a variable filter W0 that is controllably varied by its adaptive LMS algorithm $LMS_0$. The adaptive filter 58 has a variable filter W1 that is variably controlled by its adaptive LMS algorithm $LMS_1$.

The sensed vibration signal is applied as an input to the adaptive filter algorithm that controls each of the pair of variable filters. More specifically, the sensed vibration signal e(n) is applied to the adaptive filter algorithms $LMS_0$ and $LMS_1$. The outputs of the reference generators 52 and 54 are also applied to each of a pair of variable filters of a pair of adaptive filters that are controlled by an adaptive filter algorithm. More specifically, the signal from reference generator 52, which generates $\cos(h\omega t)$, is applied to variable filter W0 and the signal from reference generator 54, which generates $\sin(h\omega t)$, is applied to variable filter W1. Therefore, the output signals from variable filters W0 and W1 are quadrature sinusoidal signals each having an amplitude determined by the respective gains of variable filters W0 and W1. The respective gains for the variable filters W0 and W1 are determined by their respective adaptive algorithms $LMS_0$ and $LMS_1$ and are periodically updated. The quadrature sinusoidal signals from W0 and W1 are phasor components that can be summed (vector/phasor sums) at a summing junction 60 to provide a resultant output from the summing junction 60 that is at the harmonic frequency that is assigned to the balancing signal generator 50 and has a phase and amplitude that is determined by the $LMS_0$ and $LMS_1$ adaptive filter algorithms. These adaptive filter algorithms generate a balancing signal for the assigned harmonic. That balancing signal has an amplitude and phase so that, when summed with the principal control signal and fed forward to the armature winding of the motor/alternator, it will generate motor/alternator forces that oppose and essentially cancel the vibrations at the assigned harmonic frequency of the adaptive, balancing signal generator 50.

The design parameters for the adaptive filters are relatively simple. The algorithm itself is readily available in the prior art. The algorithm that controls each variable filter updates the variable filter in incremental steps. The two parameters chosen by the designer are (1) the update rate (how often it updates) and (2) the amount of the update (how much change in the gain of the variable filter is made at each update). The update rate is how often the LMS algorithm is processed. The update rate is chosen as some multiple of the frequency of the harmonic that is assigned to the balancing signal generator. Typically an update should occur 5 to 10 times during a period of the assigned harmonic. The amount of change in the gain of the variable filters for each incremental update is best determined experimentally by a repetitive trial and error method. Several update amounts over a range are individually tried and the stability, effectiveness in reducing the vibrations and speed of response are then observed. The chosen amount of change at each update is ordinarily a function of the fed back error, with less change for a smaller error and typically is proportional to the error amplitude. The LMS or other control algorithm determines the direction of change based upon the sign of the error.

The signal from each sinusoidally varying, cos and sin reference generator 52 and 54 is also multiplied by a transfer function $\hat{S}(z)$ and the product is applied as an input to the adaptive filter algorithms $LMS_0$ and $LMS_1$ of the adaptive filters 56 and 58. The transfer function $\hat{S}(z)$ is the transfer function from the output 50B of the balancing signal generator 50 to the sensed vibration input 62. The transfer function is a complex mathematical expression for the entire system that is external to the balancing signal generator 50. As well known, a transfer function is the ratio of output divided by input and in this case is the sensed vibration signal input at the input 62 divided by the output at output 50B of the balancing signal generator 50.

The transfer function provides an estimate or predicted response for use by the adaptive filter algorithms $LMS_0$ and $LMS_1$. The transfer function creates a model, in the sense of providing a transfer function that represents the system. The transfer function accounts for the fact that the response of the external system includes a passive balancer component. It estimates the behavior of the system with the passive balancer which is also generating a counter force opposing the vibrations at the fundamental operating frequency. The transfer function provides an estimation of the vibration that would be generated if a certain vibration canceling signal were applied by the balancing signal generator 50. Of course it is expected that the system will change greatly during operation. But the LMS algorithms use that transfer function signal to decide the direction (increase or decrease) to vary the gain of the variable filters W0 and W1 to try to reduce vibration to zero.

The transfer function $\hat{S}(z)$ can be determined in the conventional manner by determining the transfer function for each component along the path from the input to the output that it represents and multiplying them together to get the resulting total transfer function from input to output. Alternatively, however, because that is a complicated and difficult mathematical exercise, instead of developing a mathematical expression of the transfer function in that manner, it is possible, and preferred, to obtain it by laboratory measurement. For each $\hat{S}(z)$ for each harmonic, with each output 50B and input 62 disconnected from the circuit and the system not operating, an input unit sinusoid is applied to the summing junction 40. The returned error signal that is output by the vibration sensor 30 (FIG. 1) is observed and its amplitude and phase are measured. The measured returned output signal divided by the measured injected input signal is the transfer function. Both the input and the output are simply an amplitude A, phase θ and frequency $h\omega$ for each harmonic h. Consequently the output of $\hat{S}(z)$ is the expected output from the system that is external to the balancing signal generator at its assigned harmonic and represents the expected error e(n). The transfer function represents a harmonic balancing signal for the assigned harmonic divided by the sensed vibration signal corresponding to the vibration at the selected harmonic.

As stated above, the harmonic balancing signal for the selected harmonic that is assigned to a balancing signal generator is obtained by summing (phasor/vector sum) the quadrature outputs of the variable filters W0 and W1. That summing operation is represented by summing junction 60. Referring back to FIG. 1, a composite balancing signal for all the harmonics is generated by summing the balancing signals for all of the harmonics and summing that with the principal control signal. That is illustrated by applying the outputs 34B, 36B and 38B to the summing junction 40 and applying that sum to the summing junction 14.

FIG. 3 illustrates an embodiment of the invention. The adaptive balancing signal generators 334 and 336 are identical to those illustrated in FIGS. 1 and 2. However, in the embodiment of FIG. 3 the command input $A_{cmd}$ is applied to all the reference generators, such as cos reference generator 352 and sin reference generator 354. That causes the amplitude of the reference signals to be varied in proportion to $A_{cmd}$. Varying the amplitude of the reference generators as a function of $A_{cmd}$ provides the additional advantage of amplitude feed forward control.

FIG. 3, as well as FIGS. 4 and 5, also illustrates a vibration sensor 330 in more detail. The vibrations are preferably sensed by an accelerometer 370 that applies its output to an amplifier 372. The amplified output is filtered by a low pass filter 374. The cutoff frequency for the low pass filter 374 is above the frequency of the highest selected harmonic for which the designer wants to minimize the vibrations using the techniques of the present invention. Its purpose is to filter out noise at frequencies above the highest selected harmonic frequency.

The sensed vibration signal e(n) that is applied from the low pass filter 374 to the digital processor 310, through its analog to digital converter 332, is a composite analog signal that is the sum of the vibrations at the fundamental operating frequency and all of its harmonics below the filter cutoff frequency. That composite signal, in digital format, is applied to each of the adaptive balancing signal generators and therefore includes all of the Fourier components of the composite vibration signal. However, it is an inherent characteristic of the adaptive filter algorithm that it only responds to the Fourier component that is at the frequency of the reference generators 52 and 54 (FIG. 2). Each of the balancing signal generators has reference generators at its assigned harmonic frequency so each balancing signal generator only responds to its assigned frequency. Consequently, there is no need for any further filtering of the composite vibrations signal in order to extract the Fourier component for each harmonic.

FIG. 4 illustrates another embodiment of the invention and its adaptive balancing signal generators 434 and 436 are also identical to those illustrated in FIGS. 1 and 2. The embodiment of FIG. 4 is like the embodiment of FIG. 3 except that, in the embodiment of FIG. 4 the command input $A_{cmd}$ (412) is not applied to any of the reference signal generators, such as cos reference generator 452 and sin reference generator 454. Consequently, the amplitude of their generated reference signals always has a unit value so there is no amplitude feed forward that is proportional to $A_{cmd}$.

FIG. 5 is an embodiment of the invention like the embodiment of FIG. 4 except that it shows the invention integrated with a different prior art principal control system that has feedback leg 580 providing a feed forward control signal that is summed with the principal control signal. The principal control system that is prior art to the present invention and is integrated with the present invention in FIG. 5 is shown and described in my patent U.S. Pat. No. 7,511,459.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method for balancing the vibration of a coupled pair comprising a linear motor/alternator that is drivingly linked to a prime mover or load, the linear motor/alternator having an armature winding and controlled by a digital processor from a command input for reciprocating at an operating frequency, the method minimizing vibration of the coupled pair at harmonics of the operating frequency and comprising:
  (a) generating a principal control signal at the operating frequency from the command input and applying the control signal to a power stage that controls the coupled pair by applying an alternating, principal electrical drive voltage to the armature winding;
  (b) sensing the vibration of the coupled pair to provide a sensed vibration signal representing the sensed vibration;
  (c) generating a harmonic balancing signal for at least a selected harmonic of the operating frequency by processing the sensed vibration signal with an adaptive filter algorithm of an adaptive filter, the adaptive filter algorithm having a reference input at the frequency of the selected harmonic; and
  (d) summing with the principal control signal each harmonic balancing signal at each selected harmonic of the operating frequency for modifying the electrical drive voltage and thereby driving the motor/alternator of the coupled pair with a drive voltage component for each selected harmonic in opposition to the vibration at each selected harmonic.

2. A method in accordance with claim 1 wherein the prime mover or load is a Stirling machine drivingly linked with the linear motor/alternator and wherein the step of generating a harmonic balancing signal further comprises, for each selected harmonic:
  (i) generating, at the frequency of the selected harmonic, a pair of quadrature, sinusoidally varying, cos and sin reference signals and applying those signals to each of a pair of variable filters of a pair of adaptive filters that are controlled by an adaptive filter algorithm;
  (ii) inputting the sensed vibration signal to an adaptive filter algorithm that controls each of the pair of variable filters;
  (iii) multiplying each sinusoidally varying, cos and sin reference signal by a transfer function representing a harmonic balancing signal for the selected harmonic divided by the sensed vibration signal corresponding to the vibration at the selected harmonic and inputting the multiplied reference signals to the adaptive filter algorithm for each adaptive filter; and (iv) summing the outputs of the variable filters to provide the harmonic balancing signal for the selected harmonic.

3. A method in accordance with claim 2 wherein the method is performed for a plurality of selected harmonics.

4. A method in accordance with claim 3 wherein the amplitude of each pair of quadrature, sinusoidally varying, cos and sin reference signals is controllably varied in proportion to the command input.

5. A method in accordance with claim 4 wherein each variable filter is an amplitude multiplier with a gain controlled by its adaptive filter algorithm.

6. A method in accordance with claim 5 wherein the adaptive filter algorithm is a Least Mean Squares algorithm.

7. A method in accordance with claim 6 wherein each adaptive filter algorithm has a periodic update rate at which it varies its variable filter in the range of 5 to 10 times the harmonic frequency of the harmonic for which it is generating a harmonic balancing signal.

* * * * *